Patented Nov. 28, 1950

2,531,863

UNITED STATES PATENT OFFICE 2,531,863

PHENOLIC RESINS

Milton J. Scott, Springfield, and Elwood F. Jackson, Ludlow, Mass., assignors to Monsanto Chemical Company, St. Louis, Mo., a corporation of Delaware No Drawing. Application May 12, 1948, Serial No. 26,725

12 Claims. (Cl. 260—43)

1

This invention relates to anion exchange or acid-absorbing resins. More particularly, the invention relates to acid-absorbing or anion exchange resins comprising modified phenoplasts and to methods for preparing them.

The use of resinous compositions as anion exchange or acid-absorbing media has become increasingly important, especially in the purification of foodstuffs such as sugar syrups. To be economically useful, such resins must meet many critical requirements.

In the first place, the resins must be either colorless or must contain no color which can be leached out by the solutions under treatment. For instance, any color leaching out into cane sugar solutions would be particularly undesirable.

Furthermore, the resins must not only be insoluble in water, acids and alkalies but they must not swell or soften excessively in contact with such materials. Water-solubility would lead to continual losses of resin and contamination of the material being treated. Swelling and softening of the resins would lead to coalescence of the resin particles and subsequent blocking of the filter beds.

The resins must not be toxic and cannot have toxic substances associated with them which might be leached out by the materials being purified, especially if those materials are foodstuffs.

The resins must have a high capacity for the absorption of acids and the operating pH should be high enough to remove all acidic materials since a relatively low operating pH confines the use of the resin to the removal of strong acids.

After the acid-absorbing capacity of the resins has been exhausted, it must be possible to easily, efficiently and economically regenerate the resin for reuse.

The known acid-absorbing resins generally fail to meet one or more of these exacting requirements.

An object of this invention is to provide new acid-absorbing or ion exchange resins.

A further object is to provide resins having high acid-absorptive properties which may be easily and simply regenerated.

Another object is to provide acid-absorbing resins which will meet all of the requirements cited above.

These and other objects are attained by reacting an aldehyde-reactive phenolic compound with an aldehyde and a nitroparaffin and then reducing the product.

The following examples are given in illustration and are not intended as limitations on the scope of this invention. Where parts are mentioned, they are parts by weight.

Example I 94 parts of phenol were mixed with 243 parts of formalin (37% formaldehyde). To this mixture were added slowly with constant agitation 5 parts of sodium hydroxide as a 10% aqueous solution. The addition was made slowly enough so that the temperature of the mixture remained at 25° C. or lower. After all of the sodium hydroxide had been added, the reaction mixture was maintained at 25° C. for about 1 hour, accompanied by constant agitation. 183 parts of nitromethane were then added to the reaction mixture with continuing agitation, and the temperature of the reacting components was maintained at about 25° C. for about 6 hours. 1200 parts of 37% hydrochloric acid were then added to the reaction product which was then agitated continuously until a slurry containing a soft gel was formed. 162 parts of aluminum pellets were then added to the reaction mass. The aluminum was added slowly with cooling so that the reduction of the reaction product was carried out between 60 and 70° C. When no further reaction was observed, excess aluminum was dissolved in additional hydrochloric acid and the resulting insoluble particulate resin was recovered by filtration, washed with 10% hydrochloric acid followed by an aqueous wash. The resin was then reslurried with water and then treated with ammonium hydroxide until the pH of the water was above 7. The resin was again recovered by filtration and washed with water until it was substantially neutral. The product was a dark colored insoluble resin having a relatively small and uniform particle size. It did not swell excessively in water, acid or alkalies and no color could be leached out by any of these media.

In a static evaluation test such as that described by R. J. Meyers et al. in I. E. C. 33, 1270, 1941, the resin was found to have a capacity of about 23 kilograins per cubic foot calculated as calcium carbonate. Dilute hydrochloric acid was used as the exhausting agent.

Example II 94 parts of phenol were mixed with 243 parts of formalin (37% formaldehyde) and 5 parts of sodium hydroxide were added as a 10% aqueous solution to the mixture. The addition of the sodium hydroxide was regulated so that the temperature of the reaction mixture did not rise above 25° C. The reaction mixture was then held at 25° C. with constant agitation for about 1 hour. 183 parts of nitromethane were then added to the mixture, followed by the slow addition of 13 parts of 37% hydrochloric acid. This reaction mixture was maintained at about 25° C. for about 6 hours with constant agitation. 1200 parts of 37% hydrochloric acid were then added to the product with agitation until a slurry containing a soft gel was formed. To this slurry were added pelleted aluminum at such a rate that the temperature of the reaction mixture was maintained between 60 and 70° C. At the end of the reduction reaction excess aluminum was dissolved in additional hydrochloric acid. The product was a dark insoluble particulate resin. The resin was recovered by filtration, washed with water, 10% hydrochloric acid and again with water. It was then reslurried in water and treated with an excess of ammonium hydroxide until the water was at a pH higher than 7. The resin was again recovered by filtration and washed with water until essentially neutral. A static evaluation of this resin using dilute hydrochloric acid as the exhausting agent showed that the resin had a capacity calculated as calcium carbonate of about 24 kilograins per cubic foot.

Example II was repeated using 110 parts of resorcinol in place of the phenol and 267 parts of 2-nitropropane in place of the nitromethane. The product showed a capacity of 18 kilograins per cubic foot of calcium carbonate in the static evaluation test.

The phenol and resorcinol shown above may be replaced in whole or in part by other aldehyde reactable phenolic bodies such as cresols, xylenols, catechol, phloroglucinol, phenyl phenol, alkyl phenols such as p-tertiary butyl phenol, aralykyl phenols such as phenethyl phenols and the like.

The formaldehyde used may be replaced in whole or in part by other aldehydes such as acetaldehyde, butyraldehyde, furfural, benzaldehyde, etc. For reasons of convenience and economy, formaldehyde is preferred. The amount of aldehyde used may be varied from about 1 to 3 or more mols per mol of phenolic body. An excess of aldehyde may be used if desired.

The reaction of the aldehyde with the phenolic compound may be carried out at a pH of about 8 to about 11 at a temperature preferably below 30° C. in order to obtain the alkylol derivatives of the phenolic compound and to prevent further condensation of the materials thus formed into resinous products.

The nitroparaffins which may be used to react with the alkylol phenols are nitroparaffins or substituted nitroparaffins, having at least one hydrogen atom attached to the same carbon atom to which the nitro group is attached. Examples of the nitroparaffins which may be used are nitromethane, nitroethane, 1-nitropropane, 2-nitropropane, dinitroneopentane, and 2-nitro-1-butane. A mixture of the nitroparaffins may be used. Furthermore, materials like dinitroneopentane may be formed in situ by adding nitromethane and acetone or other ketones to the aldehyde-phenolic compound reaction product.

The amount of nitroparaffin used will depend on the number of alkylol groups introduced by the reaction between the aldehyde and the phenolic compound. Since it is preferred to use as many mols of aldehyde as there are active hydrogen atoms on the phenolic compound, the amount of nitroparaffin will also be generally equivalent, on a molar basis, to the number of active hydrogen atoms on the phenolic compounds. The quantity may be substantially less than this amount if desired, but usually will be at least equivalent, on the molar basis, to the amount of aldehyde reacted with the phenolic compound.

The reaction between the nitroparaffin and the alkylol phenols may take place under acid, neutral or basic conditions. It is preferred to carry this reaction out under acid conditions at a pH of about 2–4 since the acid tends to retard gelation or insolubilization until complete condensation between the nitroparaffin and alkylol phenol has been obtained. The reaction may be carried out over a period ranging from about 4 to about 12 hours at a temperature which should be maintained at less than 30° C. During this reaction period inert materials such as asbestos fibers may be added to serve as carriers for the resin.

The gel structure of the alkylol-phenol-nitroparaffin condensation product may be controlled by the amount of water present during the reaction, i. e., higher water content yields a softer gel structure which may be more easily handled in the reduction step. Furthermore, the particle size of the final resin may be controlled by the dilution of the gel during the reduction step. The filtered gel is slurried with water prior to reduction and it has been found that the particle size of the reduced resin decreases as the amount of water increases.

The final step of the reaction is the reduction of the nitro groups on the condensation product. Prior to reducing, the gel may be dried out in an oven and comminuted, in which case, the water dilution referred to above is not necessary. However, in the preferred embodiment, the soft gel is slurried in water to form an easily stirrable mixture which is then treated with nascent hydrogen which accomplishes the reduction reaction.

The reduction is an exothermal reaction and must be controlled not only to avoid frothing but also to avoid decomposition of the product. This heat of reaction may be controlled both with external cooling and also by the rate of addition of either the acid or the metal. All of the metal may be added, followed by slow addition of the acid. However, it is preferred to add most of the acid at the start, followed by the slow addition of the metal since this seems to give a more controllable reaction and avoids coating of the metal with resin which prevents the reaction of the acid with the metal. Antifoaming agents such as octyl alcohol, silicone resins, etc., may be used during the reduction period if desired.

A good reducing agent is nascent hydrogen from a mixture of zinc and hydrochloric acid. Other metals may be used, for example, aluminum, tin, cadmium, nickle, iron, etc. Other acids may be used, for example, acetic, chloracetic, formic, phosphoric, sulfamic, etc. In fact, hydrogen itself in the presence of reducing catalysts or mixtures of the same may be employed. Still other reducing agents such as sodium hyposulfite, sodium hydrosulfite, sulfur dioxide, etc. may be used. The amount of the reducing agent will depend on the number of nitro groups introduced with the nitroparaffins. An excess over the amount required may be used and this excess removed at the end of the reduction reaction.

In the examples, the acid-absorbing properties of the resins have been demonstrated with hydrochloric acid. The resins will remove other acids whether they are strong or weak, organic or inorganic and they will even absorb carbonic acid. They may be regenerated easily and quickly with aqueous solutions of ammonia or alkali metal hydroxides.

In addition to their relatively high power of removing acids from solutions thereof, the new resins are anion exchange resins capable of splitting anions from hydrolysable salts. They are even able to remove chloride from sodium chloride.

The resins of this invention have a relatively high power of removing anions or acid molecules from aqueous media. They retain a high rate of anion or acid removal until exhausted, i. e., their efficiency does not gradually taper off but continues at a high level until substantially exhausted. They may then be easily and quickly regenerated by passing aqueous alkali, ammonia or soda ash through the mass. Furthermore, they contain no leachable color, are completely insoluble and non-swelling in water and are non-toxic.

It is obvious that many variations may be made in the products and processes of this invention without departing from the spirit and scope thereof as defined in the following claims.

What is claimed is:

1. A resin as in claim 11 wherein the phenolic compound is phenol.

2. A resin as in claim 11 wherein the phenolic compound is resorcinol.

3. A resin as in claim 11 wherein the aldehyde is formaldehyde.

4. A resin as in claim 11 wherein the nitroparaffin is nitromethane.

5. A resin as in claim 11 wherein the phenolic compound is phenol, the aldehyde is formaldehyde, and the nitroparaffin is nitromethane.

6. A process as in claim 12 wherein the phenolic compound is phenol.

7. A process as in claim 12 wherein the phenolic compound is resorcinal.

8. A process as in claim 12 wherein aldehyde is formaldehyde.

9. A process as in claim 12 wherein the nitroparaffin is nitromethane.

10. A process as in claim 12 wherein the phenolic compound is phenol, the aldehyde is formaldehyde and the nitroparaffin is nitromethane.

11. A resin comprising a product prepared by reacting one mol of a phenolic compound taken from the group consisting of phenol and resorcinol with at least one mol of an aldehyde taken from the group consisting of formaldehyde, acetaldehyde, butyraldehyde, furfural and benzaldehyde, at a pH of 8–11 and at a temperature of less than 30° C., thereafter reacting the product at a temperature of less than 30° C. with at least one mol of a nitroparaffin having at least one hydrogen atom and one nitro group attached to the same carbon atom and then reducing the nitro groups to amino groups.

12. A process which comprises reacting one mol of a phenolic compound taken from the group consisting of phenol and resorcinol with at least one mol of an aldehyde taken from the group consisting of formaldehyde, acetaldehyde, butyraldehyde, furfural, and benzaldehyde at a pH of 8–11 and at a temperature of less than 30° C., thereafter reacting the product at a temperature of less than 30° C. with at least one mol of a nitroparaffin having at least one hydrogen atom and one nitro group attached to the same carbon atom and then reducing the nitro groups to amino groups.

MILTON J. SCOTT.
ELWOOD F. JACKSON.

REFERENCES CITED

The following references are of record in the file of this patent:

UNITED STATES PATENTS

| Number | Name | Date |
|---|---|---|
| 2,072,143 | Ubben | Mar. 2, 1937 |
| 2,365,121 | Traylor | Dec. 12, 1944 |
| 2,426,128 | Trowell | Aug. 19, 1947 |